United States Patent Office 3,212,078
Patented Oct. 12, 1965

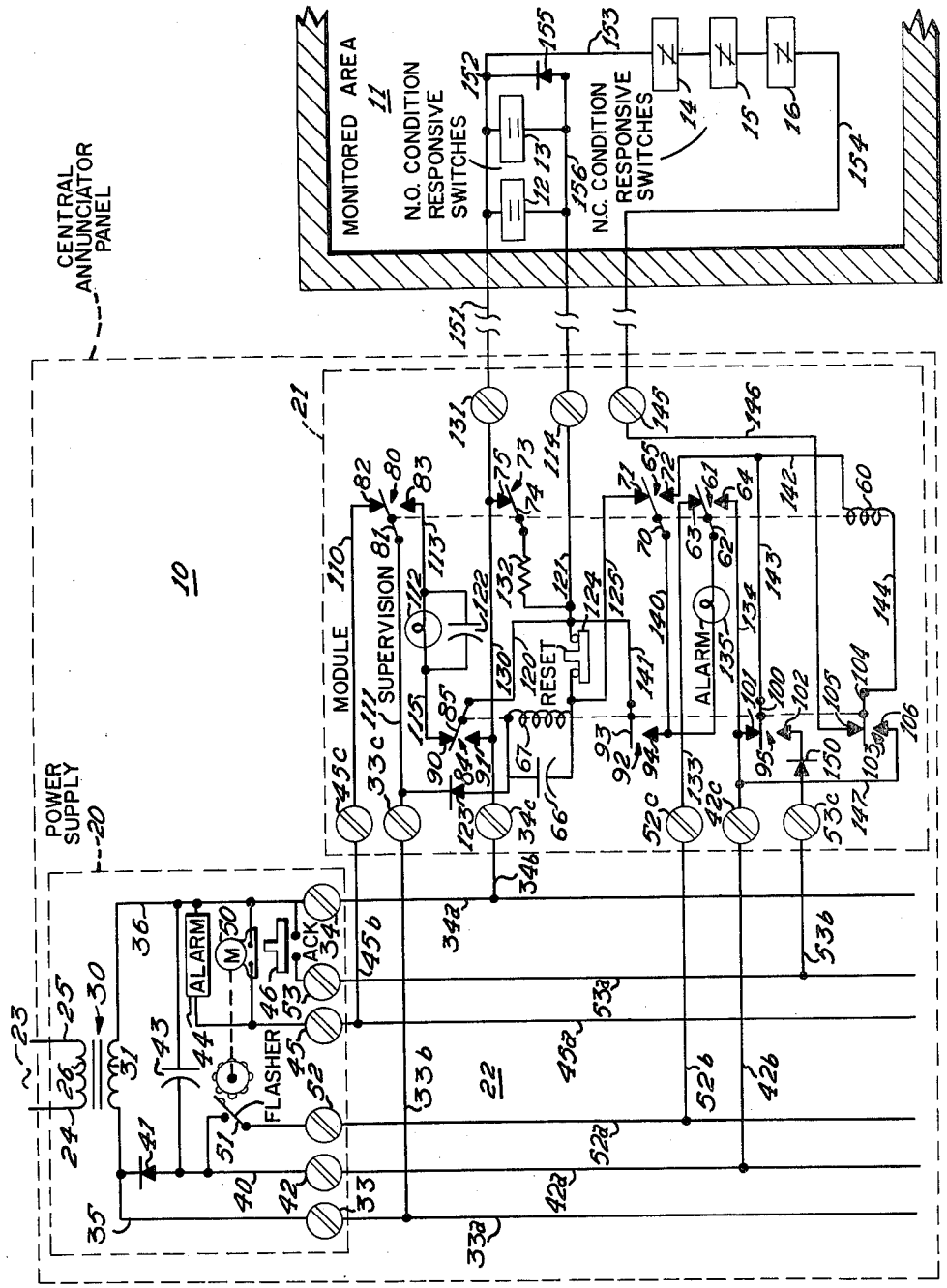

3,212,078
ANNUNCIATOR APPARATUS
James C. Shanahan, Wayzata, Minn., assignor to Honeywell Inc., a corporation of Delaware
Filed Oct. 12, 1962, Ser. No. 230,128
4 Claims. (Cl. 340—213)

This invention relates generally to supervised electrical signalling systems which give a distinctive alarm signal upon the occurrence of an abnormal condition. More specifically it relates to a modular annunciator system having a central panel capable of monitoring the status of variable conditions in a plurality of remote areas. Each module in the central panel is designed to monitor a specific remote area and is capable of detecting and reporting a change from normal of both normally open and normally closed condition responsive switches located in the associated area.

Apparatus of this general type is used extensively in modern commercial buildings to notify supervisory personnel that a predetermined change in a monitored condition has occurred. The conditions being monitored may include temperature conditions, pressure conditions, humidity conditions and the proper operating condition or position of any mechanical or electrical device.

In this particular system, the status of any condition or device can be monitored if the normal status can be represented by either a normally open or a normally closed switch. For example, a single annunciator module in a typical system could monitor a group of normally open temperature responsive switches and simultaneously monitor another group of normally closed relay switches representing the operating status of an associated group of compressor motors.

An extremely important feature of this annunciator system is that during normal operation, a supervisory current flows through the loop circuitry connecting the module to the switches in the remote area. A suitable signal is provided to announce the interruption of this current flow caused by a break in the loop circuitry. High reliability is thus assured.

The sequence of operation of this system insures that the supervisory personnel are immediately made cognizant of an alarm condition and of its source. A change to the abnormal position by one of the normally open or normally closed switches in the remote area causes a change in the current flow in the loop circuitry. A pair of relays in the annunciator module respond to this change in current flow by energizing an audible alarm and a flasher motor common to the entire group of modules. The flasher motor in turn causes a normally deenergized alarm light to flash on the individual module. A common acknowledging switch is provided on the panel to allow the operator to silence the audible alarm and to change the alarm light from the flashing condition to a steadily energized condition; and an individual reset switch on the module enables the operator to return the system to normal after the abnormal condition which caused the alarm has been located and corrected. The other annunciator modules in the system are not affected by the sequence recited above and are free to initiate a similar sequence at any time.

Annunciator systems heretofore designed have provided an alarm sequence similar to that described above but each module has been capable of monitoring only one type of switch. In such a system, a remote area having both normally open and normally closed condition responsive switches requires two separate modules, each module being equally, if not more expensive, to build and install as the dual-purpose module described in the present invention.

Many previous alarm systems have utilized a so-called "end-of-line resistor" to distinguish between an alarm condition and a trouble condition. To be effective, such a resistor must take a high percentage of the total voltage drop in the monitoring loop. The length of the monitoring loop is then determined by the voltage applied and the sensitivity of the relays used to monitor the change in current caused by an alarm or trouble condition. In a system using a low voltage power source, expensive sensitive relays are usually required to obtain a monitoring loop of any useful length. In the present invention a diode is used in place of the resistor to distinguish between an alarm condition and a trouble condition. The flow of current in one direction is then impeded only by the resistance in the alarm loop. Since the voltage is not wastefully dissipated in a resistor, the alarm loop can be lengthened, and less expensive, less sensitive relays can be utilized.

A primary object of my invention is to provide a modular annunciator system, each module of which is capable of simultaneously monitoring normally open and normally closed condition responsive switches.

A further object of my invention is to provide an annunciator system having supervised monitoring loops and a distinctive alarm sequence indicative of the status of the variable conditions being monitored.

Another object of my invention is to provide a standard modular annunciator panel requiring no field engineering changes to either simultaneously or selectively monitor normally open and normally closed condition responsive switches.

Other objects of this invention will be apparent from the specification and claims when considered in connection with the accompanying diagram in which is illustrated a typical use of my invention in a supervised annunciator system including a central panel and a representative remote area containing both normally open and normally closed condition responsive switches.

Referring now to the schematic diagram shown in the drawing, there is illustrated a central annunciator panel 10 and a typical remote area 11 containing a pair of normally open condition responsive switches 12 and 13 and a group of normally closed condition responsive switches 14, 15 and 16. Panel 10 includes a common power supply unit 20 and a representative individual annunciator module 21. A bus circuit illustrated generally at 22 provides a convenient means of connecting power unit 20 to module 21. Additional modules, not shown, could be attached to bus circuit 22 in similar fashion. Each additional module would be an exact replica of the one shown and would be connected in parallel therewith across bus circuit 22. Corresponding to each of the additional modules would be a monitored area similar to area 11.

A source of alternating current potential such as a 120 volt 60 cycle source 23 is introduced into panel 10 through a pair of conductors 24 and 25 which are connected to the primary winding 26 of a transformer 30 which steps down the applied voltage to a value suitable for use in the system. A low voltage A.C. potential is thus available across the secondary winding 31 which is in turn connected to a terminal 33 by a conductor 35 and to a terminal 34 by a conductor 36. One side of a diode 41 is connected to conductor 35 and the other side is connected to a terminal 42 by a conductor 40 to provide a pulsating D.C. potential between terminal 42 and terminal 34. A capacitor 43 is connected across conductors 40 and 36 to smooth out the pulsating D.C. in a manner well known in the art. An audible alarm 44 is connected between conductor 36 and a terminal 45. A flasher motor 50 is connected in parallel with alarm 44 and is mechanically linked to a flasher switch 51 which is connected between conductor 40 and a terminal 52. A normally open manual acknowledging switch 46 is connected between terminal 34 and another terminal 53. Connected respectively to panel terminals 33, 42, 52, 45, 53 and 34 is bus circuit 22 which specifically includes conductors 33a, 42a, 52a, 45a, 53a, and 34a. Upon the energization of transformer 30 from source 23, a source of low voltage A.C. is available across conductors 33a and 34a and a source of low voltage D.C. is available across conductors 42a and 34a. A plurality of input terminals 45c, 33c, 34c, 52c, 42c and 53c on module 21 are connected to corresponding conductors in bus circuit 22 by conductors 45b, 33b, 34b, 52b, 42b and 53b respectively.

Included within module 21 are a primary alarm initiating relay coil 60 and a secondary alarm initiating relay coil 67. Operatively attached to relay coil 60 is a group of switches including: a single pole double throw switch 61 having a movable member 62, a normally closed contact 63, and a normally open contact 64; a single pole double throw switch 65 having a movable member 70, a normally closed contact 71, and a normally open contact 72; a single pole single throw switch 73 having a movable member 74 and a normally closed contact 75; and a single pole double throw switch 80 having a movable member 81, a normally closed contact 82, and a normally open contact 83. Operatively attached to relay coil 67 is a group of switches including: a single pole double throw switch 84 having a movable member 85, a normally closed contact 90, and a normally open contact 91; a single pole single throw switch 92 having a movable member 93 and a normally open contact 94; a single pole double throw switch 95 having a movable member 100, a normally closed contact 101, and a normally open contact 102; and a single pole double throw switch 103 having a movable member 104, a normally closed contact 105, and a normally open contact 106. A conductor 110 connects terminal 45c to contact 82 and a conductor 111 connects terminal 33c to movable member 81. One side of a supervisory light 112 is connected to to contact 83 by a conductor 113. The other side of light 112 is connected to a field terminal 114 by a circuit including a conductor 115, contact 90, movable member 85, a conductor 120, and a conductor 121. A capacitor 122 is connected in parallel with light 112. A diode 123 is connected between conductor 111 and one terminal of relay coil 67. The other terminal of relay coil 67 is connected to terminal 114 through a normally closed reset switch 124 and a conductor 121, and is connected to contact 71 by a conductor 125. Connected in parallel with relay coil 67 is a capacitor 66. A conductor 130 having contacts 91 and 75 connected thereto is connected between terminal 34c and a field terminal 131. A resistor 132 and switch 73 are connected in series between conductor 121 and conductor 130. A conductor 133 connects terminal 52c to contact 63 and a conductor 134 connects terminal 42c to contact 64. An alarm light 135 is connected between movable member 62 and contact 94. Contact 94 is also connected by a conductor 140 to movable member 70. Movable member 93 is connected to conductor 121 by a conductor 141. One terminal of relay coil 60 is connected to contact 72 by a conductor 142 and to member 100 by a conductor 143. The other terminal of relay coil 60 is connected to movable member 104 by a conductor 144. A field terminal 145 is connected to contact 105 by a conductor 146 and contact 106 is connected to terminal 42c by a conductor 147. Terminal 53c is connected to contact 102 through a diode 150, and contact 101 is connected to conductor 134.

A first monitoring loop for area 11 is connected between terminal 131 and terminal 145. This monitoring loop includes in series terminal 131, a conductor 151, a terminal 152, a conductor 153, normally closed condition responsive switches 14, 15 and 16, a conductor 154 and terminal 145. A second monitoring loop is connected between terminal 131 and terminal 114. This loop circuit includes in series terminal 131, conductor 151, terminal 152, a diode 155, a conductor 156 and terminal 114. Normally open condition responsive switches 12 and 13 are connected in parallel with diode 155 between conductors 151 and 156.

*Operation*

The operation of this system may be more easily understood if the several phases of operation are considered separately. These phases or conditions include:
 (1) Start up condition (momentary).
 (2) Supervisory condition.
 (3) Fault indicating condition.
 (4) Alarm condition caused by the closure of a normally open condition responsive switch.
 (5) Alarm condition caused by the opening of a normally closed condition responsive switch.
 (6) Acknowledge alarm condition.
 (7) Reset condition (momentary).

The system as shown in the diagram is in the de-energized state. A switch described as normally open is therefore open when the associated relay coil is de-energized. The operation of the condition responsive switches in the remote area is not dependent upon a source of power from the main panel. These switches are operated by independently energized devices or by mechanically operated devices. For example, switch 12 could be operated by a temperature sensitive bimetal which would close the contacts upon a rise in temperature above a predetermined point.

(1) *Start up condition (momentary).*—When power is applied to conductors 24 and 25 in power unit 20, a low voltage A.C. source is available across terminals 33 and 34 and a low voltage D.C. source is available across terminals 42 and 34. A first circuit is immediately established to energize relay coil 60. This circuit includes terminal 34, conductor 34a, conductor 34b, terminal 34c, conductor 130, terminal 131, conductor 151, conductor 153, normally closed condition responsive switches 14, 15 and 16, conductor 154, terminal 145, conductor 146, contact 105, movable member 104, conductor 144, relay coil 60, conductors 142 and 143, movable member 100, contact 101, conductor 134, terminal 42c, conductor 42b, conductor 42a, and terminal 42. It should be noted at this point that both relays in the module are so called "D.C. relays" which become energized when placed under the influence of a low voltage direct current. A path for current flow is also found from terminal 33 through conductor 33a, conductor 33b, terminal 33c, diode 123, relay coil 67, reset switch 124, resistor 132, movable member 74, contact 75, conductor 130, terminal 34c, conductor 34b, conductor 34a, to terminal 34. A pulsating D.C. also flows through this second circuit because rectifier 123 blocks alternate half waves of the applied A.C. voltage. Although relay coil 67 is normally energizable under the influence of this D.C. flow, the relay coil does not energize immediately because of the built in delay feature which includes capacitor 66 and resistor 132. The momentary delay occasioned by this resistance-capacitance network allows relay coil 60 to energize before relay coil 67. As soon as relay coil 60 energizes, relay switch 73 opens to break the circuit to relay coil 67. Since no change is made in the first circuit, relay coil 60 remains energized while relay coil 67 remains de-energized.

(2) *Supervisory condition.*—Immediately upon the energization of relay coil 60 a third circuit is formed which includes the supervision light and the loop circuitry which is connected to the normally open condition responsive switches. Current flows through this third circuit from terminal 33, through conductor 33a, conductor 33b, terminal 33c, conductor 111, movable member 81, contact 83, conductor 113, supervisory light 112, conductor 115, contact 90, movable member 85, conductor 120, conductor 121, terminal 114, conductor 156, diode 155, conductor 151, terminal 131, conductor 130, terminal 34c, conductor 34b, conductor 34a, to terminal 34. Although an A.C. potential is applied to this third circuit, the resultant current flow is D.C. because of the inclusion of diode 155 in the circuit. Supervisory light 112 is energized by this flow of direct current, thus indicating that the circuit has been properly established. Capacitor 122 acts to smooth out the pulsating D.C. applied to light 112. The full supervisory condition is now established. A flow of current through the first circuit holds relay coil 60 energized and a flow of current through the third circuit holds supervisory light 112 energized. Thus under normal conditions, a supervisory current flows through all external monitoring loop circuitry including conductor 151, conductor 153, conductor 154, and conductor 156.

(3) *Fault indicating condition.*—A break in any of the loop circuitry connecting module 10 with area 11 will cause a fault indication to appear at the main panel 10. Specifically, a break in either conductor 151 or conductor 156 will terminate the flow of current through the third circuit, thus deenergizing supervisory light 112. A break in conductor 151, 153, or 154, will stop the flow of current through the first circuit thereby deenergizing relay coil 60. The deenergization of relay coil 60 will initiate an alarm sequence which will be described in detail in subsequent paragraphs.

(4) *Alarm condition caused by the closure of a normally open condition responsive switch.*—It should be noted at this point that a series circuit including diode 123, relay coil 67, and reset switch 124 is connected in parallel with supervisory light 112 when the system is in supervisory condition. Relay coil 67 remains deenergized however, because diode 123 and diode 155 are connected in opposite directions in the circuit. Diode 123 blocks current flow in one direction while diode 155 blocks current flow in the other direction. Now assume that normally open condition responsive switch 12 closes its contacts in response to an abnormal condition in area 11. When switch 12 closes, diode 155 is shorted out and no longer blocks current flow in one direction in the circuit. At this point, only diode 123 remains in the circuit and a flow of D.C. results through relay coil 67 thereby causing its energization. A holding circuit is immediately established for relay coil 67 which includes conductor 33b, terminal 33c, diode 123, relay coil 67, reset switch 124, conductor 120, movable member 85, contact 91, terminal 34c, and conductor 34b. This holding circuit assures that relay coil 67 will remain energized even though condition responsive switch 12 should return to its normally open position. At the same instant, movable member 104 moves to its other position thereby breaking the first circuit and deenergizing relay coil 60. The switches associated with relay coil 60 then move to their normally deenergized positions to initiate the following alarm sequence. Audible alarm 44 and flasher motor 50, being connected in parallel, are simultaneously energized by the current flow through a circuit which includes conductor 36, alarm 44 and motor 50, terminal 45, conductor 45b, terminal 45c, conductor 110, contact 82, movable member 81, conductor 111, terminal 33c, conductor 33b, conductor 33a, terminal 33, and conductor 35. Upon becoming energized, motor 50 operates flasher switch 51 through a mechanical linkage. Flasher switch 51 opens and closes a circuit to provide a pulsing flow of direct current to flash alarm light 135 on module 21. This circuit includes conductor 40, flasher switch 51, terminal 52, conductor 52a, conductor 52b, terminal 52c, conductor 133, contact 63, movable member 62, alarm light 135, contact 94, movable member 93, conductor 141, conductor 120, movable member 85, contact 91, terminal 34c, conductor 34b, conductor 34a, and terminal 34. Alarm light 135 thus flashes at a rate determined by the speed of operation of motor 50 and flasher switch 51. Supervisory light 112 is now deenergized because contact 83 is no longer connected to movable member 81 and contact 90 is no longer connected to movable member 85. The system is now in full alarm condition with relay coil 67 energized, relay coil 60 deenergized, supervisory light 112 deenergized, alarm light 135 flashing, and audible alarm 44 energized.

(5) *Alarm condition caused by the opening of a normally closed condition responsive switch.*—To explain this condition, it is assumed that the system is again in supervisory condition. The opening of a normally closed condition responsive switch such as switch 14 will cause the termination of current flow through the first circuit to thereby deenergize relay coil 60. The deenergization of relay coil 60 results in the same alarm sequence as described in the previous paragraph. It is once again necessary to set up a holding circuit to retain the system in alarm should switch 14 return to its normally closed condition. This is done by energizing relay coil 67 and setting up a holding circuit for it. With relay coil 67 energized, relay contact 105 and movable member 104 are no longer connected. This breaks the first circuit to prevent the energization of relay coil 60. Current flow is provided to energize relay coil 67 through a circuit which includes terminal 33c, diode 123, relay coil 67, reset switch 124, resistor 132, movable member 74, contact 75, conductor 130 and terminal 34c. The same holding circuit for relay coil 67 as previously described is then established through movable member 85 and contact 91. It is thus apparent that the same alarm sequence will result from either the closing of the normally open condition responsive switches or the opening of the normally closed condition responsive switches.

(6) *Acknowledged condition.*—Once the supervisory personnel are aware that an alarm condition exists, it is no longer necessary to continue operating the audible alarm or the flasher. Since only one audible alarm and one flasher motor are provided for a plurality of modules, it is also necessary to make these available in case an alarm occurs in an area monitored by a different module. An acknowledgment switch is thus provided to enable the operator to silence the audible alarm and deenergize the flasher motor while retaining an indication on the individual module that the alarm condition still exists. To place the system in this condition, the operator momentarily depresses acknowledgment button 46. This does not affect the holding circuit for relay coil 67, which remains energized, but it does affect the status of relay coil 60. A circuit is established to energize relay coil 60 which includes conductor 36, acknowledgment button 46, terminal 53, conductor 53a, conductor 53b, terminal 53c, diode 150, contact 102, movable member 100, conductor 143, conductor 142, relay coil 60, conductor 144, movable member 104, contact 106, conductor 147, terminal 42c, conductor 42b, conductor 42a, and terminal 42. The energization of relay coil 60 immediately breaks the energization circuit for the audible alarm and flasher motor by moving movable member 81 away from contact 82. At the same time a holding circuit for relay coil 60 is set up which includes terminal 42c, conductor 147, relay switch 103, conductor 144, relay coil 60, conductor 142, contact 72, movable member 70, conductor 140, contact 94, movable member 93, conductor 141, conductor 120, movable member 85, contact 91, and terminal 34c. At this time both relays are energized and both relays have holding circuits established to maintain this condition regardless of the position of the condition responsive switches in area 11. Alarm light 135 also becomes steadily energized through a circuit which includes terminal 42c, conductor 134, contact 64, movable member 62, alarm light 135, contact 94, movable member 93, conductor 141, conductor 120, movable member 85, contact 91 and terminal 34c. The reason for including diode 150 in the circuit should be explained at this point. The basic reason is to prevent interaction between modules which are in different conditions of operation. Specifically, such interaction could arise in the following situation. Assume that a first module in the system is in the ackowledged alarm condition and that a second module is in the normal supervisory condition. With the first module in the acknowledged condition, one side of A.C. source 31 is actually connected to conductor 53a by a circuit which includes conductor 36, terminal 34, conductor 34a, conductor 34b, terminal 34c, conductor 130, contact 91, movable member 85, conductor 120, conductor 141, movable member 93, contact 94, conductor 140, movable member 70 contact 72, conductor 143, movable member 100, contact 102, terminal 53c, and conductor 53b. By placing diode 150 in the circuit, only half waves of a definite polarity are impressed upon conductor 53a. These half waves are then prevented from entering the second module through terminal 53c by a similar diode which now prevents the passage of current of the polarity which was allowed to pass through the diode in the first module. If diode 150 were not used, A.C. would be present on conductor 53a whenever a module was in the acknowledged condition. As soon as another module went into alarm condition, a circuit would be set up within that module which would cause the immediate energization of relay coil 60. This circuit would include conductor 53b, terminal 53c, contact 102, movable member 100, conductor 143, conductor 142, relay coil 60, conductor 144, movable member 104, contact 106, conductor 147, terminal 42c, and conductor 42b. By using diode 150, this interference with the alarm function is prevented.

(7) *Reset condition (momentary)*.—After the abnormal condition in area 11 has been returned to normal, there is no longer a need to maintain the system in the acknowledged alarm condition. The system must be returned to supervisory condition in order to again be in position to sound an alarm upon the detection of a new abnormal condition. Under acknowledged alarm conditions, relay coil 60 and relay coil 67 are both energized. Under supervisory conditions relay coil 60 is energized while relay coil 67 is deenergized. To return the system to a normal supervisory condition then, it is only necessary to deenergize relay coil 67 by breaking the previously described holding circuit. To break the holding circuit for relay coil 67, a reset switch 124 is provided on each module. When reset switch 124 is momentarily depressed, relay coil 67 is deenergized and relay switch 84 returns to its normal position. The supervisory circuit described in paragraph two is again established for the loop monitoring the normally open condition responsive switches At the same time, the circuit which maintained relay coil 60 in the energized condition during the acknowledged alarm condition is broken by the movement of relay switch 103 to its normal position. Relay coil 60 remains energized, however, since the circuit described in the first paragraph is again established through the normally closed condition responsive switches. The system is now in supervisory condition once again.

Thus it can be seen that this circuit provides a simple, flexible and unique method of monitoring the condition of a plurality of normally open and normally closed condition responsive switches located in a group of remote area. While I have described and illustrated what appears to be the preferred form of the invention, the scope of the invention should only be limited by the appended claims in which

I claim:

1. A supervised annunciator system designed to simultaneously monitor normally open and normally closed condition operated switches comprising: a source of A.C. power and a source of D.C. power having a common terminal, alarm means, first relay means having a coil and a switch operated thereby, second relay means including a coil and a switch operated thereby, a first circuit including in series said normally closed switches, said switch of said second relay means and said coil of said first relay means, means connecting said first circuit to said D.C. source to thereby energize said first relay means, circuit means including said switch of said first relay means adapted to connect said alarm means to said A.C. source upon the deenergization of said first relay means, a first diode connected in a series circuit with said coil of said second relay means, fault indicating means, means connecting said fault indicating means in parallel with said series circuit to form a parallel circuit, a second diode, circuit means connecting said parallel circuit and said second diode in series to form a second circuit; and means connecting said second circuit to said A.C. source whereby said fault indicating means become normally energized, said first diode and said second diode being connected in opposite directions to normally block current flow through said coil of said second relay means, said normally open switches being connected across said second circuit in parallel with said second diode, said coil of said second relay means becoming energized upon the closing of one of said normally open switches to shunt said second diode, said switch of said second relay means being adapted to break said first circuit to deenergize said first relay means upon the energization of said second relay means thereby energizing said alarm.

2. A supervised annunciator system designed to simultaneously monitor a plurality of normally open and normally closed condition operated switches comprising: first relay means having a coil and a switch operated thereby, second relay means including a coil and a switch operated thereby, circuit means connecting in series said normally closed switches, said switch of said second relay means and said coil of said first relay means to form a first circuit, a source of power, means connecting said first circuit to said source to thereby energize said first relay means, alarm means, circuit means including said switch of said first relay means adapted to connect said alarm means to said source upon the deenergization of said first relay means, a first diode connected in a series circuit with said coil of said second relay means, fault indicating means, means connecting said fault indicating means in parallel with said series circuit, a second diode, circuit means connecting said parallel circuit and said second diode in series to form a second circuit; and means connecting said second circuit to said source whereby said fault indicating means become normally energized, said first diode and said second diode being connected in opposite directions to normally block current flow through said coil of said second relay means, said normally open switches being connected across said second circuit in parallel with said second diode, said coil of said second relay means becoming energized upon the closing of one of said normally open switches to shunt said second diode, said switch of said second relay means being adapted to break said first circuit to deenergize said first relay means upon the energization of said second relay means thereby energizing said alarm.

3. A supervised annunciator system designed to simultaneously monitor normally open and normally closed condition operated switches comprising: alarm means, primary alarm initiating means, a first circuit including in series said normally closed switches and said primary alarm initiating means, a source of power, means connecting said first circuit to said source to thereby energize said primary alarm initiating means, said alarm means being responsive to the deenergization of said primary alarm initiating means, secondary alarm initiating means, fault indicating means, means connecting said fault indicating means in parallel with said secondary alarm initiating means to form a parallel circuit, a diode, circuit means connecting said parallel circuit and said diode in series to form a second circuit; and means connecting said second circuit to said source to provide a flow of current therethrough whereby said fault indicating means become normally energized and said secondary alarm initiating means remain normally deenergized, said normally open switches being connected in parallel with said diode, said secondary alarm initiating means becoming energized upon the closing of one of said normally open switches to short out said diode and being adapted to thereupon deenergize said primary alarm initiating means.

4. A supervised annunciator system designed to simultaneously monitor normally open and normally closed condition responsive switches comprising: a diode, a first conductor, a second conductor, said conductors connecting said normally open switches in parallel and terminating at said diode to form a first monitoring loop circuit, a source of A.C. power, a central panel including means connecting said A.C. source to said first loop circuit to provide a flow of current therethrough, alarm means in said panel responsive to a change in said current flow in said second conductor occasioned by the closing of one of said normally open switches to short out said diode; fault indicating means in said panel responsive to a termination of said current flow in said second conductor caused by a break in said first loop circuit, a third conductor, means connecting said third conductor, said normally closed switches connected in series and said first conductor to form a second monitoring loop circuit, a source of D.C. power; and circuit means in said panel connecting said D.C. source to said second loop circuit to provide a flow of current therethrough, said alarm means being responsive to the termination of said current flow in said third conductor caused by the opening of one of said normally closed switches in said second loop circuit.

References Cited by the Examiner
UNITED STATES PATENTS

| | | | |
|---|---|---|---|
| 2,730,702 | 1/56 | Marmorstone | 340—213.1 X |
| 2,813,263 | 11/57 | Warren | 340—213.1 |
| 3,107,348 | 10/63 | McNeill | 340—213.1 |
| 3,136,982 | 6/64 | Sargent | 340—213.1 |
| 3,155,950 | 11/64 | Foster | 340—213.2 |

FOREIGN PATENTS 581,057  8/59  Canada.

DAVID G. REDINBAUGH, *Primary Examiner.*